United States Patent
Pettman et al.

(10) Patent No.: US 11,214,848 B2
(45) Date of Patent: Jan. 4, 2022

(54) METHODS OF PURIFYING PRECIOUS METAL

(71) Applicant: Cycladex Inc., Winter Park, FL (US)

(72) Inventors: Roger Bruce Pettman, Winter Park, FL (US); Dale F. Arnold, The Woodlands, TX (US)

(73) Assignee: CYCLADEX INC., Winter Park, FL (US)

( * ) Notice: Subject to any disclaimer, the term of this patent is extended or adjusted under 35 U.S.C. 154(b) by 151 days.

(21) Appl. No.: 16/085,209

(22) PCT Filed: Mar. 17, 2017

(86) PCT No.: PCT/IB2017/051556
§ 371 (c)(1),
(2) Date: Sep. 14, 2018

(87) PCT Pub. No.: WO2017/158561
PCT Pub. Date: Sep. 21, 2017

(65) Prior Publication Data
US 2019/0085428 A1    Mar. 21, 2019

Related U.S. Application Data

(60) Provisional application No. 62/309,601, filed on Mar. 17, 2016.

(51) Int. Cl.
| C22B 11/00 | (2006.01) |
| C22B 3/44 | (2006.01) |
| C22B 59/00 | (2006.01) |

(52) U.S. Cl.
CPC ............ *C22B 11/04* (2013.01); *C22B 3/44* (2013.01); *C22B 59/00* (2013.01); *Y02P 10/20* (2015.11)

(58) Field of Classification Search
CPC .......... C22B 59/00; C22B 3/44; Y02P 10/234
USPC ................................ 423/21.1, 22, 34; 534/15
See application file for complete search history.

(56) References Cited

U.S. PATENT DOCUMENTS

| 3,488,144 | A | * | 1/1970 | Sargent | .................. C01G 55/00 |
| | | | | | 423/22 |
| 2003/0209106 | A1 | * | 11/2003 | Doubrava | ............. C22B 11/046 |
| | | | | | 75/407 |
| 2008/0302671 | A1 | * | 12/2008 | Pearce | .................... C22B 3/045 |
| | | | | | 205/571 |
| 2014/0230604 | A1 | * | 8/2014 | Pavlovich | ................. C22B 3/14 |
| | | | | | 75/300 |
| 2014/0311297 | A1 | | 10/2014 | Stoddart et al. | |
| 2015/0122734 | A1 | | 5/2015 | Riman et al. | |

FOREIGN PATENT DOCUMENTS

| JP | S62275183 | A | 11/1987 |
| WO | WO 2014-1172667 | * | 10/2014 |

OTHER PUBLICATIONS

Abstract of JP 62-275183 A. (Year: 1987).*
Konyratbekova, et al., "Non-cyanide Leaching Processes in Gold Hydrometallurgy and Iodine-Iodide Applications: A Review", Mineral Processing and Extractive Metallurgy Review, US, (Nov. 10, 2014), vol. 36, No. 3, pp. 198-212. (Abstract Only).
PCT International Search Report for PCT/IB2017/051556, dated Jun. 13, 2017, 4 pages.
Trindade et al., "Dissolution of gold in oxidized bromide solutions", HYDROMETALL. '94, Pap. Int. Symp, (Jan. 1, 1994), pp. 527-540. (Abstract Only).
Zhao et al., "An EDTA-[beta]-cyclodextrin material for the adsorption of rare earth elements and its application in preconcentration of rare earth elements in seawater", Journal of Colloid and Interface Science, (Nov. 30, 2015), vol. 465, pp. 215-224. (Abstract Only).
Bai, et al., "Highly selective recovery of palladium by a new silica-based absorbent functionalized with macrocyclic ligand," Separation and Purification Technology, 2013, pp. 38-46, vol. 106.
Dai et al., "A review of copper cyanide recovery technologies for the cyanidation of copper containing gold ores," Minerals Engineering, 2012, pp. 1-13, vol. 25.
Gupta et al., Extraction and separation of platinum, palladium, and rhodium using Cyanex 923 and their recovery from real samples, Hydrometallurgy, 2013, pp. 11-18, vol. 134-135.
Paul, Roger, "Resin-in-Solution Approach Solves Gold-Copper Selectivity Problem," Engineering and Mining Journal—Process solutions, Mar. 2010, 6 pages.

* cited by examiner

*Primary Examiner* — Steven J Bos
(74) *Attorney, Agent, or Firm* — Honigman LLP; Fernando Alberdi; Jonathan P. O'Brien

(57) ABSTRACT

This invention relates to methods for the recovery of precious metals such as gold, silver, platinum, palladium and rare earths from precious metal-bearing materials.
In particular, a method of purifying precious metal from a precious metal-bearing material comprising the steps
  a) forming an aqueous acidic oxidant mixture from hydrogen peroxide an acid and a source of bromide ion, said acidic oxidant mixture having a pH in the range 0 to 6;
  b) contacting the acidic oxidant mixture with the precious metal bearing-material to oxidise the metal and form a metal bromide salt solution containing the metal bromide $MBr_n$ and/or $[MBr_{n+1}]^-$ where n is the valency of the oxidised metal ion $M^{n+}$; and
  c) controlling the metal bromide salt solution to a value in the range 3-7 by providing alkali metal ions $A^+$ in the solution to form an alkali metal/metal bromide solution containing the salt $AMBr_{n+1}$ in solution.

20 Claims, 6 Drawing Sheets

METHODS OF PURIFYING PRECIOUS METAL

CROSS-REFERENCE TO RELATED APPLICATIONS

This application claims the benefit of and priority under 35 U.S.C. § 371 to Patent Cooperation Treaty Application PCT/IB2017/051556394, filed Mar. 17, 2017, which claims the benefit of priority to U.S. Provisional Patent Application Ser. No. 62/309,601, filed Mar. 17, 2016, the entire contents of both disclosures are incorporated herein by reference in their entireties.

FIELD OF THE INVENTION

This invention relates to methods for the recovery of precious metals such as gold, silver, platinum, palladium and rare earths from precious metal-bearing materials.

BACKGROUND OF THE INVENTION

Considerable interest exists in methods for recovering precious metals from precious-metal-bearing materials. Besides the obvious economic incentives associated with this, environmental motivations justify extracting gold from certain precious bearing waste materials (for example, consumer electronics and biosolids).

A common method for gold and silver recovery uses a cyanide leaching process in which highly poisonous inorganic cyanides convert for example gold (0) into a water-soluble $Au(CN)_2^-$ coordination complex, i.e. containing gold (III), which is subsequently isolated using cementation, absorption, or solvent extraction as typical methods. The cyanide leaching process for gold and silver recovery is undesirable, as accidental leakages of cyanide result in environmental contamination and inadvertent cyanide exposure to those who conduct the process causes needless human health concerns. The cyanide process will also not extract other precious metals such as platinum or palladium which when this technology was first introduced in the 1850's, were not of commercial interest. Accordingly, developing processes for precious metal recovery using environmentally benign chemistry is not only important from a commercial and green chemistry perspective, but such efforts may also lead to health benefits for the processing workers.

In WO2014172667 there are described various methods for recovery of gold by using various initial steps for oxidising and dissolving the gold to form a gold salt, followed by addition of cyclodextrin to form an insoluble gold salt complex with the cyclodextrin. The inventors found that selection of a specific halide anion, a specific alkali metal cation, and a specific cyclodextrin allowed recovery of insoluble complex from solution. Furthermore, the complex precipitated whilst other metals present remained in solution, or were not initially solubilised. Thus good isolation of gold from silver and copper present in the gold-bearing materials was achieved. The silver can be recovered using other means including activated carbon.

The crystal structure of the recovered precipitates are described in detail by Liu et al (Selective isolation of gold facilitated by second-sphere coordination with alpha-cyclodextrin), Nature Communications 4:1855 DOI:10.1038/Ncomms2891 (2013). Liu et al further describe in that article the selectivity of alpha cyclodextrin for co-precipitation with $KAuBr_4$ in the presence of other square-planar noble metal complexes such as palladium and platinum.

In WO2014172667, gold metal in the gold-bearing starting materials were oxidised, for instance, by use of bromine, hypobromite/bromide, ozone/bromide, hypobromite produced from potassium hydroxide and bromine, hypobromite produced electrolytically, or using 1,3-dibromo-5,5-dimethylhydantoin ($Br_2$(DMH))/bromide. It would be desirable to use a source of oxidant that is more convenient to produce and handle.

Some gold and silver ores are known as refractory ores, the precious metals being particularly difficult to extract, even with grinding to small particle size and extended leach times. Ores containing high concentrations of pyrite and arsenopyrite are refractory. These ores are characterised by high total sulfur values. Oxidative pretreatment may increase recovery levels. Various methods have been used prior to standard cyanide treatment, including using bacterial oxidation, roasting in excess air, pressure oxidation in air with acidic catalysts at high temperature and hydrogen peroxide in acid, e.g. hydrochloric.

DESCRIPTION

According to the invention there is provided a new method of purifying precious metal M from a precious metal M°-bearing material comprising the steps:

a) forming an aqueous acidic oxidant mixture from hydrogen peroxide an acid and a source of bromide ion, said acidic oxidant mixture having a pH in the range 0-6;

b) contacting the acidic oxidant mixture with the precious metal bearing-material to oxidise the metal and form a metal bromide salt solution containing the metal bromide $MBr_n$ and/or $[MBr_{n+1}]^-$ where n is the valency of the oxidised metal ion M';

c) contacting the acidic oxidant mixture with the precious metal bearing-material to oxidise the metal and form a metal bromide salt solution containing the metal bromide $MBr_n$ and/or $MBr_{n+1}^-$ where n is the valency of the oxidised metal ion $M^{n+}$;

d) controlling the pH of the metal bromide salt solution to a value in the range 3-7 by providing alkali metal ions $A^+$ in the solution to form an alkali metal/metal bromide solution containing the salt $AMBr_{n+1}$ in solution;

e) adding cyclodextrin to the alkali metal/metal bromide solution to precipitate a metal cyclodextrin complex; and f) recovering the metal cyclodextrin complex.

In step a) it is believed that the following reaction takes place

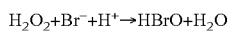

In step b) it is believed that the following reactions takes place

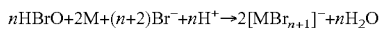   2

In step c) the salt $AMBr_{n+1}$ is formed.

In step d) the complex $AMBr_{n+1} \cdot mH_2O \subset pCD$, where p is the ratio of equivalents of CD units in the complex to moles of $AMBr_{n+1}$.

The method is useful for recovery of precious metals such as gold, silver, platinum, palladium and rare earths. The precious metal-bearing material contains at least one of these precious metals M in the form of the metal (M°). The starting material may contain several precious metals from which one or more than one such metal is desired to be isolated. The invention is of particular value in recovery of gold and silver from ores containing both metals, and that also contain other metals or metal compounds such as copper, platinum, palladium or other rare earth metals. The method of the invention may recover two or more metals, either in admixture, or, preferably separately, especially where separation takes place in step d) at least.

In the new method, the acid used in step a) is selected from hydrogen halide, nitric acid, sulphuric acid and mixtures thereof. The hydrogen halide is, for instance, hydrogen fluoride, hydrogen chloride, hydrogen bromide or hydrogen iodide. Preferably the acid is hydrogen bromide. More preferably a mixture of hydrogen bromide with nitric or sulphuric acid is used as the acid. The amount of acid used is sufficient to achieve the desired pH, which is in the range 0-6, and is preferably in the range 1-5, more preferably in the range 1 to 1.5 or 2.0.

The source of bromide ion may be at least in part from the use of hydrogen bromide alone or in combination with another acid as the acid. Additionally or alternatively, the bromide maybe derived from a water soluble bromide salt, especially an alkali metal bromide, most preferably selected from sodium and a potassium bromide or from electrolysis of bromine. The bromide is present in an amount in excess of the amount required to form $[MBr_{n+1}]^-$. Since other metals present in the precious metal-containing material may also be oxidised and form salts with bromide, the amount of bromide is generally far in excess of the stoichiometric amount required to form said $[MBr_{n+1}]^-$ anion.

In step c) of the process, the pH of the alkali metal/metal bromide salt solution prior to contact with cyclodextrin, should be in the range 3-7. The pH of the product of step a) is usually lower than the required level, and so adjustment takes place by addition of a base, especially an alkali metal hydroxide. The pH is generally controlled in step c) to a value in the range 3-6, preferably 4-5.5. Where M is gold, at such pHs, the precipitate of CD complex with the alkali metal/metal bromide salt is optimally insoluble and will leave bromide salts of other metals in solution which can be subsequently recovered using other methods including activated carbon. Also the temperature in step d) may be controlled by lowering to a temperature at which the complex is even less soluble and the extended complexes are formed (see below for the explanation of the extended complexes).

Cyclodextrin is available commercially in the forms alpha, beta and gamma cyclodextrin. These differ from one another by a number of glucose monomer units in the cyclic dextrin structure. The alkali metal/metal bromide salt forms a complex with a regular number of CD units, usually more than 1 mole or CD unit per mole of salt. The stoichiometry depends on a number of factors relating to the nature of the alkali metal, the nature of the precious metal M, the level of hydration of the salt and the size of the CD ring.

The complexes with gold (III) bromide salts with potassium or sodium cation can coordinate well with alpha cyclodextrin as a 1:2 complex and an extended complex $\{[K(OH_2)_6][AuBr_4] \subset (\alpha\text{-}CD)_2\}_m$, where m is equal to or greater than 1 for instance is 5 or more, even 10 or more.

The amount of CD added in step d) is preferably more than the level required to form said stoichiometric complex. Where the complex is of potassium/gold bromide the amount is more than the stoichiometric amount by at least 1% preferably at least 5% for instance around 10%. There is no significant additional benefit in using more than about 15% or even more than 10%, although the amount depends on the presence of other metal ion containing species present that form complexes with CD in competition with Au(III).

The alkali metal/metal bromide salt should have a concentration of at least 1 mM, preferably at least 5 mM, more preferably 10 mM or more, upon addition of cyclodextrin, in order to recover a high yield of the alkali metal/metal salt CD complex. The complex is soluble to a low level. Thus by ensuring a relatively high concentration of the salt solution, little of the dissolved complex will be lost in the supernatant when the precipitate is recovered.

Also it is preferred that the complex be subjected to minimal mechanical energy during recovery, since the extended complex in the precipitate is disrupted by application of mechanical energy resulting in more difficult or lower levels of recovery.

Recovery of the precipitate from the supernatant in step e) is achieved by appropriate solid-liquid separation techniques. As indicated above, the technique should involve as little mechanical disruption of the precipitate as possible. Suitable methods involve allowing the precipitate to settle form the supernatant, optionally including centrifugation, or by filtration and combinations thereof. Examples of metal mixture include two or more elements from Groups IA, IIA, IB to VIIIB, the lanthanide series and actinide series of the periodic table, such as a metal mixture that includes at least one of, and substantially several of Au, Ag, Pd and Pt.

The precious metal-bearing material is selected from an ore, a metal mixture, a human body component, or a post-consumer product. Examples of an ore include mineral veins, mineral deposits and the like obtained from waterways, causeways, mines, and other Earth-bound sources known in the art. Examples of a human body component include teeth, bones, heart, muscle, joints, legs, arms, hands, fingers, knees, feet, among others. Examples of human body components that support or augment human life form include life support systems and devices, such as a diagnostic machine, a medical device (for example, a dialysis machine), a medical implant (for example, a pacemaker), tooth filling, enamel or inlay, dentures, and an artificial joint, limb or appendage, materials removed after diagnostic e.g. radiodiagnostic or therapeutic administration comprising metal-containing nanoparticles among others. Examples of post-consumer product include a jewelry item, an electronics item, predominantly metal products and coins, among others. Examples of a jewelry item include a ring, a bracelet and a necklace, among others. Examples of an electronics item include a computer, a monitor, a power supply, an amplifier, a preamplifier, a digital to analog converter, an analog to digital converter, and a phone, among others. Examples of sources in predominantly metal form include a powder, ingot, or bar of gold, silver, platinum, among others. Examples of coins include as a currency.

Most conveniently the precious metal bearing material is a mineral or mineral deposit obtained from a mine, especially a gold ore having a gold concentration in the range 0.1 to 50 ppm and optionally also having a silver concentration in the range 1 to 500 ppm.

The invention is of particular value in the treatment of refractory ores where an oxidative pretreatment might be indicated, for instance having a total sulfide content of at least 200 ppm, for instance at least $10^3$ ppm, up to as much as $10^6$ ppm. Such ores may be subjected to pretreatment to oxidise the sulfur-species present, for instance using peroxide in acidic media, prior to step a) of the process of the invention. Other oxidative pretreatment steps may be used in place or in addition to acidic peroxide treatment.

An ore may be subjected to preliminary steps of reducing the size of particles and/or agglomerating particles to provide controlled size agglomerates. The ore may be treated with the oxidant mixture in the form of a heap of particles as used in conventional gold refining. The particles may optionally be agglomerated in a heap. Lixiviate is collected from under the heap or from a vat using conventional means. Thus the present invention may be used with equipment already in use at gold mining facilities.

The ore may be reduced in size so as to be processable as fluid slurry and contacted with the oxidant mixture in vats. For instance such slurry may be treated in a sequence of vats, wherein the treated solids flows in one direction through the sequence of vats and pregnant leachate (lixiviate) flows in the opposite direction through said sequence. Alternatively the leach may be conducted in batch fashion, decanting, centrifuging and/or filtering the lixiviate from the vat after leaching. In this mode multiple stages may still be employed in a counter-current operation supplying fresh lixiviate to the last vat (most expended ore) and refreshing and reusing the pregnant solution for each successive stage.

As in metal refining from ores, it is important for the side products of the reaction to be recycled, optionally with regeneration, so as to optimise the percentage recovery of gold or other precious metal.

In a continuous process forming one embodiment of the invention, the process is controlled to an extent by continuous measurement of the pH and the oxidation reduction potential (ORP) of the precious metal bromide salt solution, (the mixture of lixiviate and ore) and controlling the relative rates of addition and composition of the oxidant mixture and the gold bearing material to the process streams forming the reaction mixture for step b) by reference to the oxidation-reduction potential (ORP).

The oxidation-reduction potential is a measure of electrical potential which represents the tendency of one chemical species to oxidize or reduce another chemical species. Solutions of chemical species with a high (positive) potential tend to gain electrons thereby oxidising the other species, i.e., cause the other species to lose electrons. Conversely, a solution with a low (negative) potential will have a tendency to lose electrons thereby reducing the other species, i.e., cause the other species to gain electrons.

In an aqueous solution the ORP is commonly measured and expressed in millivolts. The ORP is measured as a relative value by detecting the difference between the electrical potential of a measurement electrode (typically a platinum or gold electrode) and the electrical potential of a reference electrode (typically a silver-silver chloride electrode) in contact with the solution. The typical accuracy for an ORP meter is ±5 mV.

While the ORP meter does not provide an absolute measurement and many factors can influence the measurement, e.g., solution pH, temperature, and concentration, ORP analysis can be reproducible and serve a useful function. The ORP measurements provide an indication of the presence of oxidising species, such as HOBr, central to the extraction of the gold from the ore. The ORP of the lixiviant is preferably at least +500 mV. In situ measurements made with a Milwaukee model MW 500 ORP meter suggest an ORP of +700 to +900 mV is necessary for effective extraction levels with the oxidant mixture introduced into step b) of the process of the invention, also known as lixiviant solutions.

The process of the present invention utilises hydrogen peroxide as the oxidant in the first step of processing a precious metal containing material. Oxidation takes place in the presence of an anion and a cation to form a soluble salt with the oxidised precious metal such as gold (III) cation. This salt may be represented as $AMBr_{n+1}$, where M is the precious metal of oxidation state $n^+$ and A is the alkali metal. The alkali metal is selected from lithium, sodium, potassium, cesium and rubidium. Preferably the alkali metal ion is selected from sodium and potassium and is most preferably potassium. The salt of $AuBr_4^-$ with potassium has good complex-forming characteristics with alpha cyclodextrin as described by Liu et al, op.cit.

The use of hydrogen peroxide as the oxidant in the present process provides an economic, commercial and environmental preference to other oxidants. More specifically, hydrogen peroxide is available commercially at very large scale and the breakdown products are water and oxygen being the ultimate in environmentally clean oxidants.

Hydrogen peroxide may be provided for use in the process in the form of an aqueous solution which can vary in concentration from 5-100% more preferably 20-70% by weight, for instance an acidic aqueous solution. The product is available from many companies on a commercial basis and can be supplied at large scale by road or rail. These companies include but are not limited to PeroxyChem, Solvay GmbH, Kemira, Arkema. Some companies offer the concept of on site generation. Such on-site generation may be useful in the present invention.

The process of the invention may comprise the later step of recovering precious metal by contacting the precipitate collected in step e) with either activated carbon or a reductant to form metal. This step may be carried out using conventional steps such as by reduction using sodium thio sulfate, sodium metabisulfic or using zinc metal (Merrill-Crowe process).

BRIEF DESCRIPTION OF THE DRAWINGS

FIG. 1 is a flow chart which shows an overview of a vat leaching cycle for gold and silver-containing materials such as ore. Leaching takes place in vat system 1. The vat system may comprise several vats in sequences as described and illustrated further below in FIG. 3. Into the vat system is fed gold and silver-containing materials such as ore and lixiviant. Lixiviant is made up in part by recycled lixiviate after removal of gold and other metals, and rejuvenation by addition of appropriate levels of hydrogen peroxide, bromide and acid in reservoir 2. After leaching has taken place for sufficient time, lixiviate and barren solid are separated in solid liquid separation step 3. This step may also involve counter-current rinsing of the separated solid to ensure optimum recovery of oxidised and solubilised gold. The liquid is then subjected to conditions to achieve precipitation/crystallisation in step 4. In the present invention this step essentially includes adding cyclodextrin to the gold salt solution. This step may preliminarily involve a step of concentrating the solution and/or cooling the solution to provide optimum conditions for CD-complex precipitation.

The recovered precipitate is subsequently reduced at step 5 and gold metal is recovered. Residual liquid from the gold crystallisation step 4 is then treated to recover salts including silver remaining in solution after step 4, by collecting the salts in solid form, so as to be able to recycle liquid lixiviate residue into the process. The solids containing other metal compounds may subsequently be reduced to form metals.

The liquid lixiviate is recycled to the reservoir 2 after being rejuvenated with hydrogen peroxide and acid as necessary. The ORP is monitored to control the level of hydrogen peroxide added to the lixiviate residue. pH is monitored to control the level of acid added.

Figure 1:
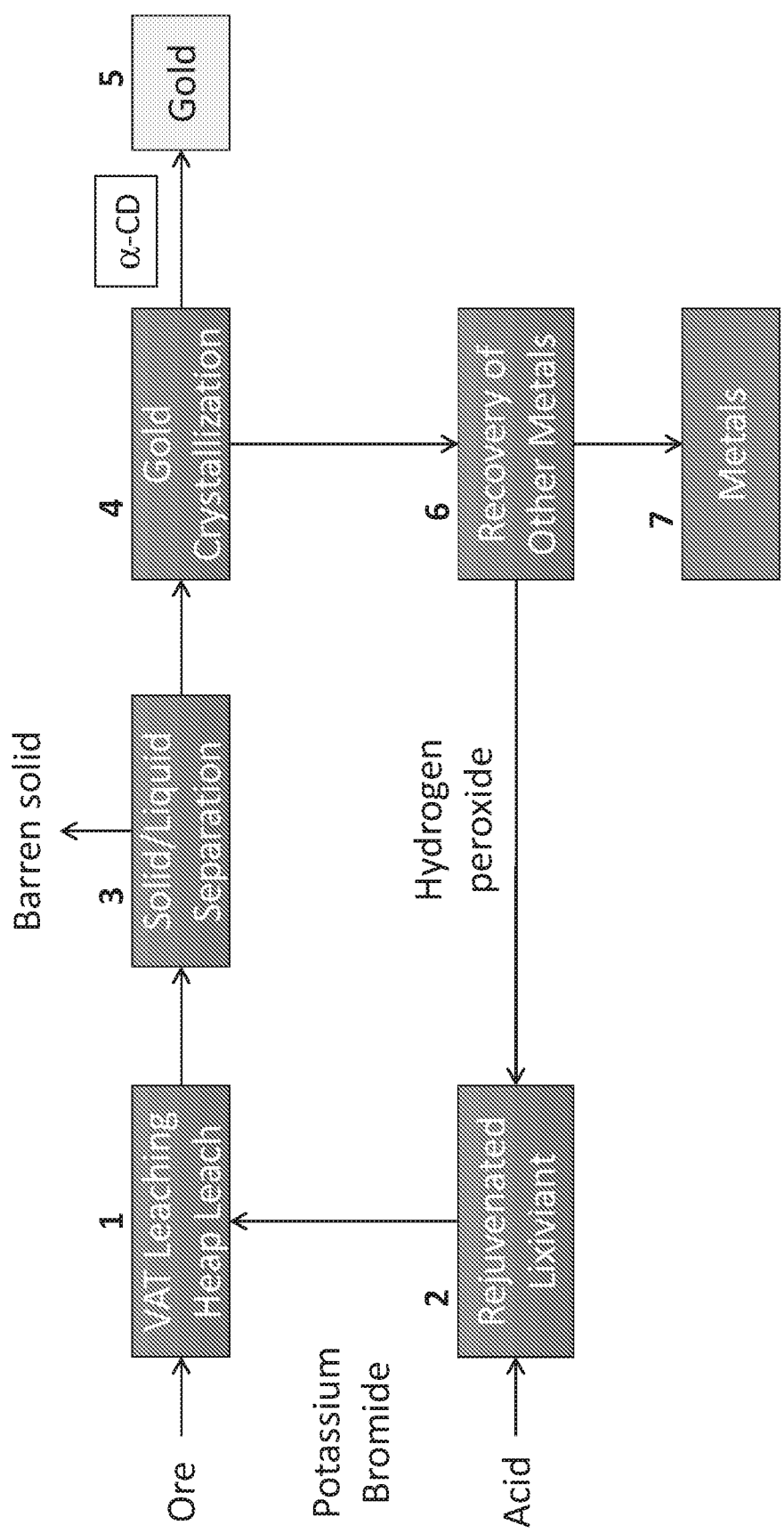
FIG. 1 represents an overview of flow diagram of vat leaching for gold and silver from an ore.
Figure 2:
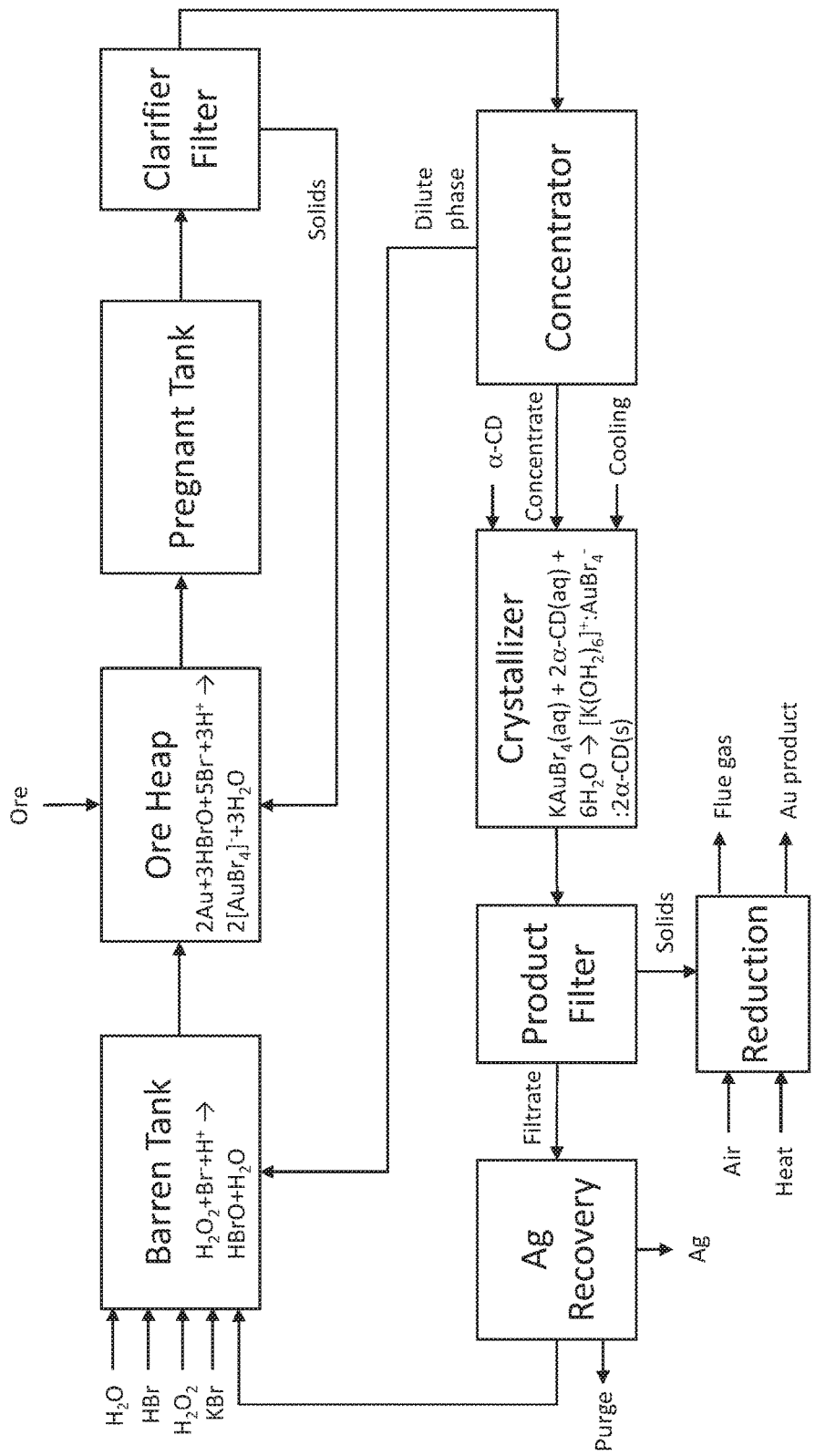
FIG. 2 is a flow diagram indicating the key chemical reactions happening at each stage of the process.

In FIG. 2 is illustrated diagrammatically the cycle for heap leaching of a gold ore. With reference to FIG. 2 the chemical reactions taking place can be understood, which in general are the same as the reactions taking place in the process illustrated in FIG. 1. In the FIG. 2 process, lixiviant is generated in barren tank 18 where the reaction 1 above takes place. Contact of the lixiviant with ore is by leaching that takes place in a heap 11 where the reaction is the following, that is a combination of reactions 2 and formation of the alkali metal salt with $MBr_{n+1}$ anion. The heap is formed by depositing ore in the form of particulate material, with particle sizes controlled by conventional means involving particle size reduction achieved by mechanical or chemical means, and/or agglomeration, especially to minimise the presence of small particulates which may cause problems in flow of lixiviant through the ore heap. Lixiviant is added to the heap along stream 21, the stream having controlled levels of pH, ORP and bromide. From the base of the heap, lixiviate is collected in stream 22 into tank 13. Since stream 22 may contain residual particulates, these may be collected by settlement or, if necessary, by passing through a filter 14 to clarify the liquor. Solids retrieved from the filter may be recycled along stream 15 and, optionally after agglomeration, added back to the ore heap 11.

Pregnant liquor from the clarifier 14 is passed to concentrator 16 which increases the concentration of dissolved $AMBr_{n+1}$ salt for subsequent complexation. The diluted lixiviate, free of dissolved precious metal, is recycled from the clarifier along stream 17 to be rejuvenated in the lixiviant tank 18.

The concentrated alkali metal/precious metal bromide salts are passed in stream 19 usually batch wise into the crystalliser tank 20. In this tank the pH is controlled, generally increased, prior to addition of α-cyclodextrin in stream 23. Additionally, the temperature in the tank is controlled after addition of CD. Following addition of CD, in sufficient amounts so as to form the desired ratio of CD:$AMBr_{n+1}$ complex for precipitation to occur, the slurry of precipitate is passed along stream 24 to solid liquid separation step 25, conveniently comprising a filter, using for instance an ashless filter medium. Solids are collected on stream 26 and passed to reduction stage 27, in which precious metal, usually gold, is reduced and recovered.

The filtrate from sold-liquid separation phase 25 is subsequently treated to recover side products such as silver metal, by known means. Residual liquid comprising oxidant, bromide and water is recycled along stream 29 into the lixiviant rejuvenation tank 18.

In tank 18, through monitoring of the concentrations of bromide, pH and oxidation-reduction potential (ORP), the composition of the lixiviant passed along lixiviant stream 21 is controlled to the desired level for heap leaching, by controlling raw material inputs of potassium bromide, hydrogen bromide, other acid as necessary and hydrogen peroxide.

Figure 3:
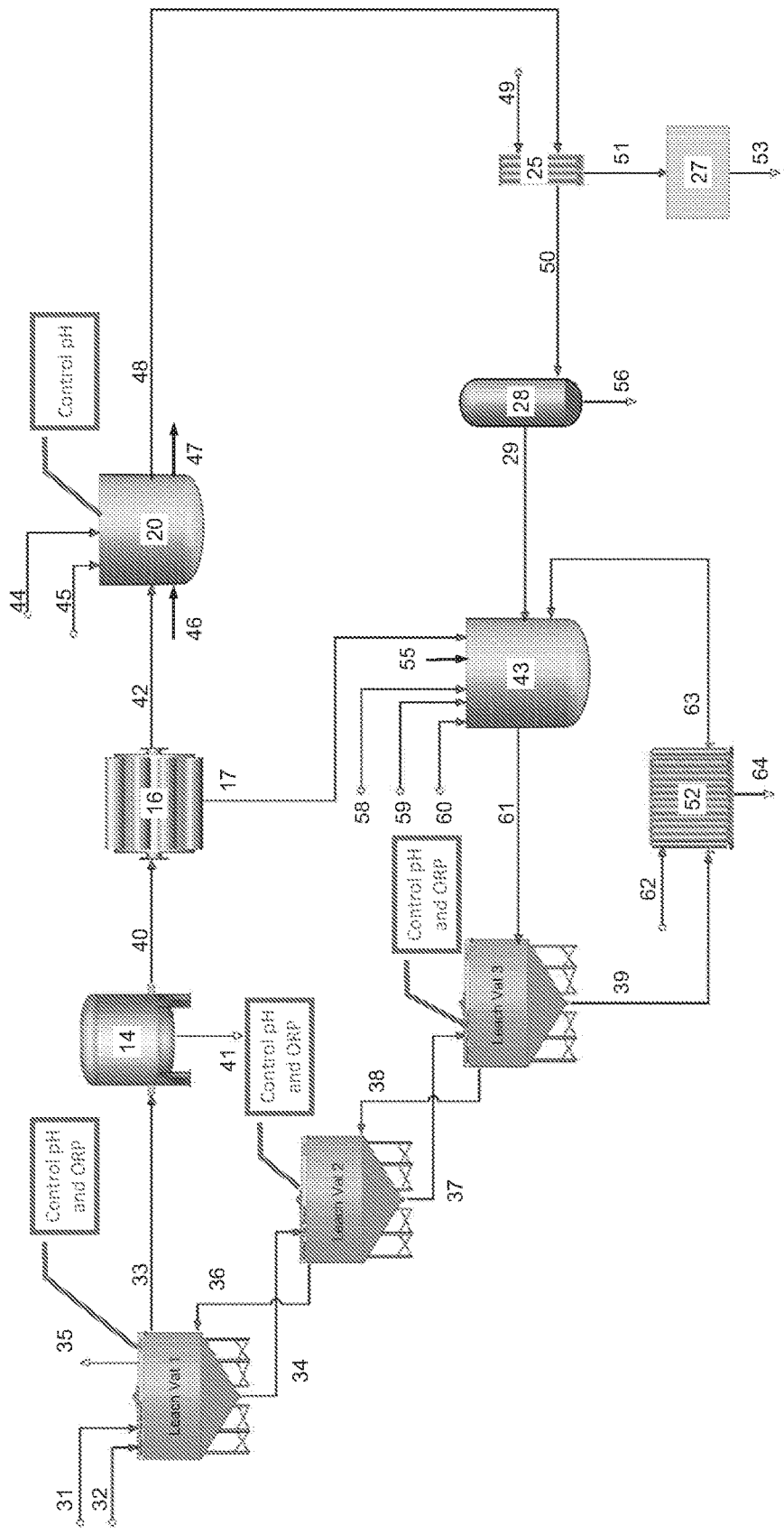
FIG. 3 shows a flow chart of a vat leach process according to the invention.

In FIG. 3 a more detail flow diagram is shown of a vat leach process involving a series of three vats. Into leach vat 1 is fed raw material ore 31 and concentrated hydrobromic acid 32. Lixiviant collected from leach vat 2 along stream 36. Leach 8 from vat 1 passes along stream 33 and is transported into clarifier filter 14. Leach vat 1 is additionally provided with a vent 35, for release of any gases such as carbon dioxide that may be produced by contact of carbonate-containing ores with acid.

Solids filtered out from the clarifier are removed along stream 41 and may be recycled into leach vat 3. The liquid from the filter which contains dissolved $AMBr_{n+1}$ salt solution passes along stream 40 into the concentrator 16. The pregnant concentrate passes from the concentrator 16 along stream 42, while the dilute fraction from the concentrator is recycled along stream 17 into the lixiviant rejuvenation/bromination tank 43.

The concentrated solution of $AMBr_{n+1}$ (42) is transferred into the crystalliser 20. Base may be added along stream 45, for instance potassium hydroxide, to achieve the desired pH for complex formation. The crystalliser is also subjected to cooling by providing fluid coolant inlet 46 into a coolant jacket from which warmed coolant is recovered 47 for potential recovery of heat energy elsewhere in the process and recycling to the chiller.

Once the desired pH and temperature are reached, α-cyclodextrin is added to the crystalliser via stream 44. Complex formation takes place under appropriate low shear conditions in the crystalliser 20. The temperature is controlled (reduced) to maximise yield. The slurry of precipitated complex is fed along line 48 into filter 25. The solid residue may be washed in the filter by rinse 49, with the gold salt-CD complex being recovered with the filter medium along stream 51 to the reduction station 27, from which gold metal is recovered 53.

From the product filter, the supernatant is recovered and subjected to appropriate steps for recovery of other metal species, such as silver, in station 28, with silver being recovered in stream 56. From the side product recovery stage 28, the residual liquid containing, for instance, bromide and residual oxidant, is recycled along recycle stream 29 into the rejuvenation stage, bromination tank 43.

In bromination tank 43, the lixiviant for adding to leach vat 3 is made up by rejuvenating the liquor recycled from other process steps with appropriate levels of hydrogen peroxide 60, hydrobromic acid 59 and potassium bromide 58. There may also be necessary addition of water 55. The rejuvenated lixiviant is fed along line 61 into leach vat 3. The solids addition to leach vat 3 is that recovered from leach vat 2. Solids from leach vat 3, which is spent ore, is fed along line 39 into a solid/liquid separation stage 52, where it is rinsed for removal of residual lixiviate. The liquid from the filter 52 is recycled into the bromination tank 43 along stream 63.

The rinsed spent ore 64 is subsequently used as aggregate or disposed of.

The slurry being treated in leach vat 3 is generally monitored for the oxidation reduction potential, so that the input of lixiviant and output of lixiviate from that vat are controlled accordingly. Lixiviate from leach vat 3 passes along stream 38 into leach vat 2. As mentioned earlier, the solid input for leach vat 3 is the treated ore from leach vat 2 which passes along line 37. In a similar fashion, the treated solids from leach vat 1 pass along stream 34 to become the solid input into leach vat 2, whilst the lixiviate from leach vat 2 becomes the lixiviant for leach vat 1 along stream 36.

The following Examples illustrate the invention.

Overview

Leach tests have been performed on the beaker and bottle-roll scale for different types of ore with acidic lixiviants based on hydrogen bromide (HBr) and/or nitric acid (HNO$_3$), potassium bromide (KBr) and hydrogen peroxide (H$_2$O$_2$). Hydrogen peroxide is available commercially in a variety of concentrations with the preferred concentration between 30-70% by weight. In general, the following test procedures have been employed to selected ore samples:
1. Short-time (two hours or less) beaker-scale test without probe taking.
2. Long-time (six to eight hours) beaker-scale test with probe taking.
3. Successive, beaker-scale leach test with repeated leaching of tailings (one or two hours per stage).
4. Bottle-roll test (72 hours) with probe taking.

So far, all beaker-scale tests were performed with suspensions initially at room temperature. Bottle-roll tests were performed on an outdoor rolling facility at outdoor temperature (if above 15° C.) or by using an installed heat lamp during low-temperature periods. The leach tailings, after drying, have been processed by fire assaying, followed by acid digestion, for further analysis. The amount of gold and other metals in the leachate has been measured by atomic adsorption spectroscopy (AAS) analysis at each end point and for the sampled probes. Data analysis included mass balance evaluation, determination of head grades by fine assay and tailing-based calculated head grades (CHGs), determination of tailings by fire assay and calculation of recoveries.

ORP is tested using a portable Milwaukee Model 500 ORP meter using a SE-300 combination probe having a platinum ORP electrode for measurements in the range from −1000 to +1000 mV (1 mV resolution, ±5 mV accuracy).

α-CD is procured from Wacker GmbH.

EXAMPLE 1

Base Method for Leaching Ore to Form Solution of Gold (III) Bromide Salt.

In a typical leach test a mass of Au, $m_{Au,l}$ is leached from an ore sample of mass $m_{samp}$. $m_{Au,l}$ includes the Au in the final suspension and, in case of probe taking, the additional Au amount over all sampled probes. The following table demonstrates data derivation for a 6 h leach test at pH<2, in which 600 g Test Ore No. 4 was leached in 722 mL water with HBr (about 10% Br) and H$_2$O$_2$.

| Parameters | Duplicate A | Duplicate B |
|---|---|---|
| Mass of Au, $m_{Au,\,l}$, leached from $m_{samp}$ = 600 g ore | 8.583 mg | |
| Total mass of dried tailing, $m_{tail}$ | 571 g | |
| Mass of Au retained in tailing, $m_{Au,\,r}$ | 1.88 mg3 | 2.47 mg |
| Total mass of Au, $m_{Au,\,t}$ = $m_{Au,\,l}$ + $m_{Au,\,r}$ | 10.46 mg | 11.05 mg |
| Calculated head grade (CHG), g Au/ton ore | 17.4 g/ton | 18.4 g/ton |
| Recovery | 82% | 78% |

8.58 mg Au was leached out from 600 g ore. Duplicate samples taken from the dried tailing with an initial mass of 571 g were subjected to the fire-assay/acid digestion procedure. Based on AAS analysis of the two digestion liquids, an amount of 1.88 mg and 2.47 mg was determined, respectively, as being retained in the tailing. The initial total mass of Au in the 600 g ore sample, then, is 10.46 mg and 11.05 mg, respectively. The CHG is calculated as follows: CHG/(g/ton)=1000·$m_{Au,t}$/$m_{samp}$, with $m_{Au,t}$ in mg and $m_{samp}$ in g. The recovery in percent is 100·($m_{Au,l}$/$m_{Au,t}$).

EXAMPLE 2

Gold Leaching Depending on Ore Pre-Treatment

Figure 4:
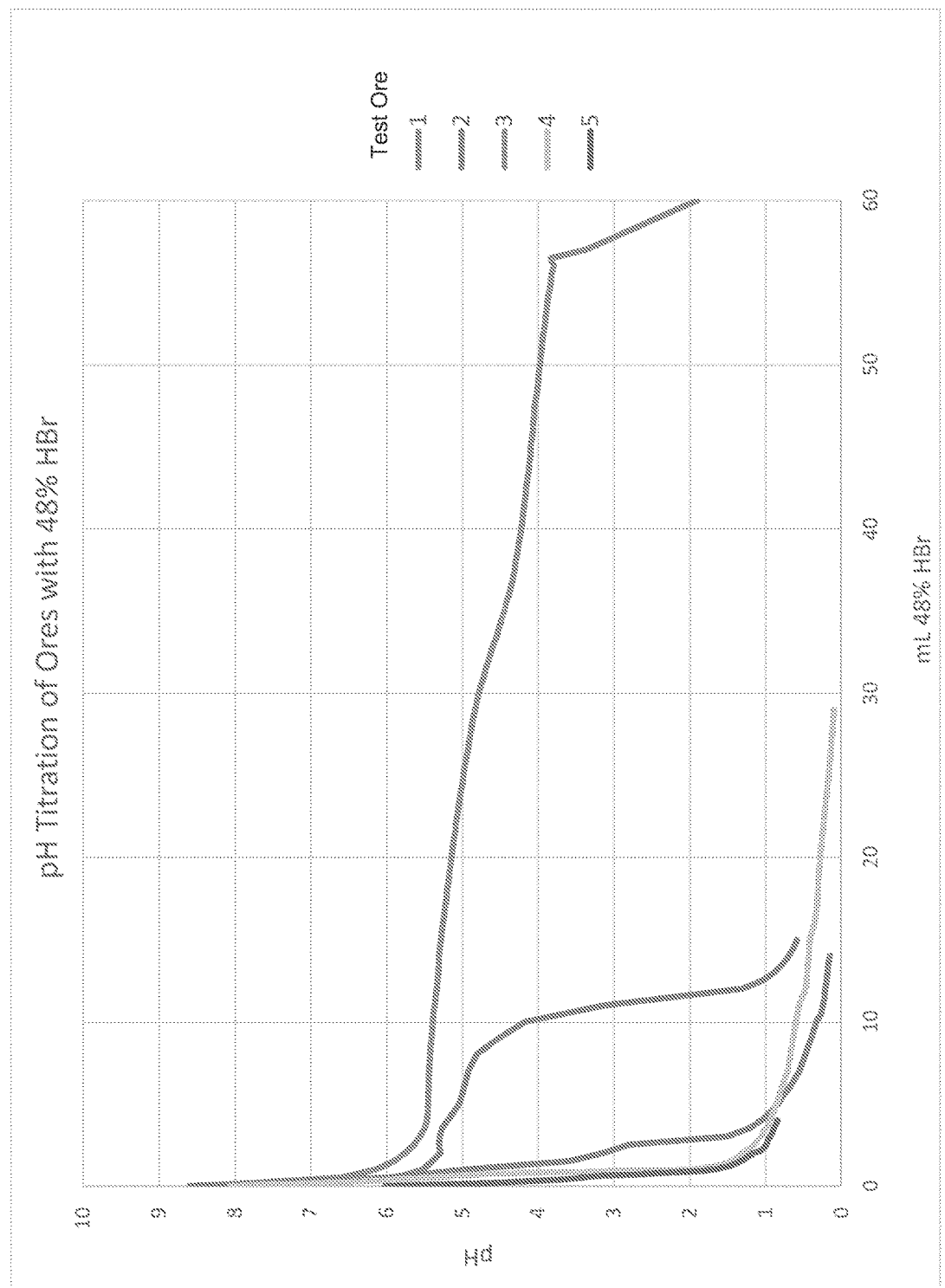
FIG. 4 shows the pH titration curves for the test ores 1-5 using 48% HBr.

Leach testing was performed with milled (pulverized to nominally 90% minus 100 mesh) ore and coarse-grained (crushed to nominally 90% minus ¼ inch (6 mm)) ore. Typically, milled ore was used in beaker-scale tests, while coarse-grained ore was applied in bottle-roll tests to more realistically simulate conditions in future column, heap-leach and vat-system testing. The tested ores are described in Appendix A. When treated with deionized water (60 g ore treated with 90 ml water), all ores gave alkaline suspensions with a pH above 8. Leach tests were performed at pH values below 5. The amount of acid needed to get an initial suspension at the desired pH strongly depends on the type of ore. pH titration curves are shown in FIG. 4. For example, for the Test Ore No. 2, a carbonate and sulfide containing ore, the plateau at pH 5 is assumed to be caused by hydronium ion, H$_3$O$^+$, consumption during decarboxylation, while the plateau below pH 1 is assumed to relate to the reaction of H$_3$O$^+$ with released sulfide ions. Extensive foaming was always observed while adding HBr during the pH 5 stage. While adding HBr around or below pH 2, a thin yellow film could be seen at the surface of sulfide-bearing ore suspensions.

EXAMPLE 3

Gold Leaching Depending on Initially Supplied Hydrogen Bromide

Figure 5:
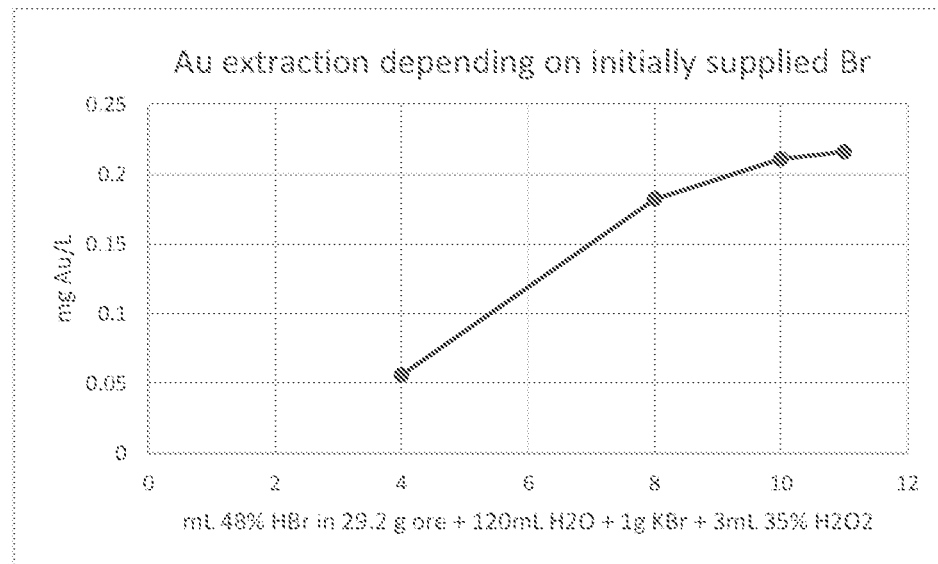
FIG. 5 shows the results of leaching of Test Ore No. 1 as a function of total Br concentration.

For efficient leaching of Au from ore, the lixiviant reagents need to be in large excess. FIG. 5 shows the extraction efficiency for Test Ore No. 1 in 45-minute-beaker-tests as a function of the amount of initially supplied HBr, while the amounts of the other lixiviant components (KBr and H$_2$O$_2$) were kept constant. (29.2 g ore, 120 ml water. 1 g potassium bromide, 3 ml 35% hydrogen peroxide). HBr is added as a 48% water solution.

Larger amounts of HBr increase the concentration of bromide ions and, after adding H$_2$O$_2$, their leach-promoting oxidation products in the suspension. At the same time, increasing amounts of HBr lower the pH towards more favourable leaching conditions. However, in suspensions of carbonate-rich ore, such as Test Ore No. 1, H$_3$O$^+$ ions are around pH 5 consumed by decarboxylating the ore.

The leaching of these carbonate ores (i.e. Test ores Nos. 1 and 2) showed, that it is impossible to arrive at a constant pH as long as foaming can be observed, indicating an ongoing decarboxylation reaction. Nevertheless, some Au could be extracted under decarboxylation conditions. Extraction results show comparatively larger Au amounts and better reproducibilities. The addition of H$_2$O$_2$ usually changes the pH, sometimes immediately, but typically by a pH increase over the course of the leach run. If not adjusted by the addition of acid (HBr or HNO$_3$), the acidity may decrease by over two pH units. pH changes from 3 to above 5 have been observed during non-adjusting leach tests, dramatically slowing or inhibiting gold extraction.

EXAMPLE 4

Gold Leaching Depending on Initially Supplied Hydrogen Peroxide

In this test HBr and $H_2O_2$ are consecutively added to the ore suspension. Depending on scale, ore type, pH and amount of present HBr, typical duration times for the slow, step-wise addition of $H_2O_2$ are between ten to twenty minutes; to avoid fast heating and rapid evolution of $O_2$. By definition, the time at which $H_2O_2$ addition is completed, is taken as the start time of the leach run. The addition of $H_2O_2$ and the subsequent leach steps are monitored with an ORP probe with the goal to keep the ORP reading between 700 and 900 mV over the complete test.

EXAMPLE 5

Gold Leaching Depending on Overall Amount of Lixiviant

Metal leaching always requires excess amounts of lixiviant. Leach tests with Test Ore No. 3 demonstrate how the doubling of the lixiviant amount results in more than doubling Au recoveries. Since Test Ore No. 3 suspensions exhibit an extended buffer plateau around pH 1, they are ideal to test the effect of changes in HBr amount at nearly constant pH. About 30% Au recovery was obtained by leaching a suspension of the ore (60 g ore+90 mL water) with 7 mL 48% HBr and 4 mL 35% $H_2O_2$ at pH 1.25 for two hours, see results in table 1.

Leaching a suspension of the same composition with 15 mL 48% HBr and 9.7 mL 35% $H_2O_2$ resulted in recoveries of about 80%, see results in Table 1.

TABLE 1

| Parameter | Units | Lower Lixiviant Concentrate | | Higher Lixiviant Concentration | |
|---|---|---|---|---|---|
| | | DupA | DupB | DupA | DupB |
| Mass Au leached from 60 g ore | mg Au | 0.057 | Same | 0.168 | Same |
| Mass Au leached per ore mass | g Au/ton ore | 0.952 | Same | 2.80 | Same |
| Total mass of dried tailing | g ore | 55.636 | Same | 54.712 | Same |
| Mass Au retained in ½ AT tailing | mg Au | 0.0337 | 0.0383 | 0.0101 | 0.011 |
| Mass Au retained in 55.64 g tailing | mg Au | 0.129 | 0.146 | 0.038 | 0.041 |
| Mass Au, retained + leached based on 60 g ore | mg Au | 0.186 | 0.203 | 0.206 | 0.209 |
| Calculated head grade | g Au/ton ore | 3.10 | 3.38 | 3.43 | 3.48 |
| Recovery | Percent | 31 | 28 | 82 | 80 |

EXAMPLE 6

Leaching Gold by "Replacing" Some Hydrogen Bromide by Potassium Bromide

HBr as a lixiviant component fulfils two roles: the maintenance of acidic conditions and the supply of bromide. If a low pH (pH<2) is already obtained by addition of HBr amounts, then a larger supply of initial bromide can be achieved by further adding KBr instead of HBr. The use of KBr has an economical advantage and also provides potassium to the leachate, which is essential for a successful co-precipitation of $AuBr_4^-$ with α-CD.

The following results on Test Ore No. 4 show that reducing the amount of HBr and adding KBr instead can be done without negatively affecting recoveries. The results are shown in Table 2.

Leach Test: HBr only route 600 g ore+722 mL water, 150 mL 48% HBr (10% Br), 85 mL 35% $H_2O_2$, pH<2, 6 h.

Leach Test: HBr plus KBr route 600 g ore+722 mL water, 135 g KBr, 27 mL 48% HBr getting pH to 0.97, 85 mL 35% $H_2O_2$ getting ORP=765 mV, 6 h.

TABLE 2

| Parameter | Units | HBr only lixiviant | | HBr + KBr lixiviant | |
|---|---|---|---|---|---|
| | | DupA | DupB | DupA | DupB |
| Mass Au leached from 600 g ore | mg Au | 8.583 | Same | 16.166 | Same |
| Mass Au leached per ore mass | g Au/ton ore | 14.3 | Same | 26.943 | Same |
| Total mass of dried tailing | g ore | 571 | Same | 576 | Same |
| Mass Au retained in ½AT g tailing | mg Au | 0.048 | 0.063 | 0.0693 | 0.0893 |
| Mass Au retained in 571 g tailing | mg Au | 1.88 | 2.47 | 2.739 | 3.526 |
| Mass Au, retained + leached based on 600 g ore | mg Au | 10.46 | 11.05 | 18.905 | 19.692 |
| Calculated head grade | g Au/ton ore | 17.4 | 18.4 | 31.508 | 32.820 |
| Recovery | Percent | 82 | 78 | 86 | 82 |

EXAMPLE 7

Gold Leaching Depending on pH

Figure 6:
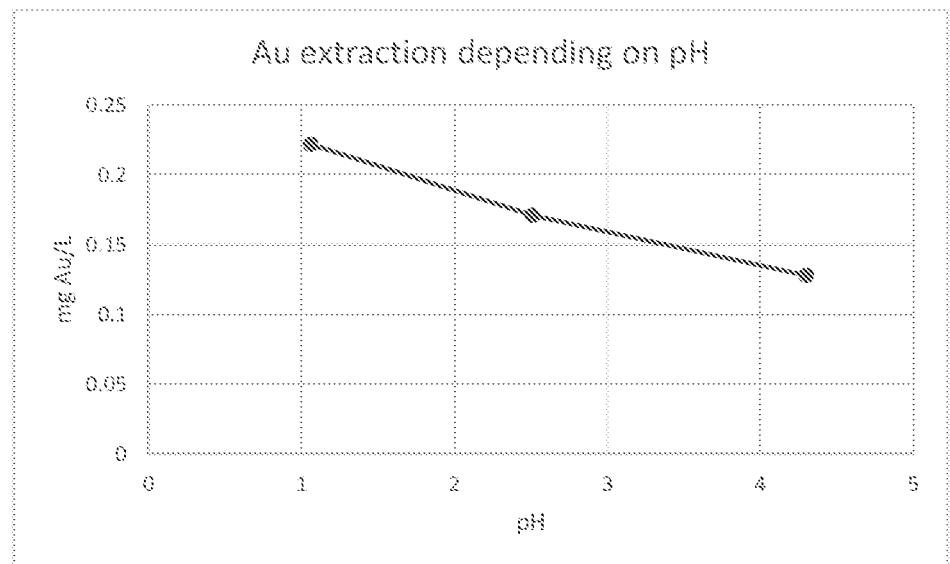
FIG. 6 shows the results of increase in extraction of Au from Test Ore No 1 with increase in acidity (decrease in pH).

Au extraction efficiency increases with lowering the pH. FIG. 6 shows the increase in Au extraction as a function of pH. The pH was adjusted to values between 1.5 and 4.5 by addition of HBr for the system Test Ore No. 1+100 mL $H_2O+1$ g KBr+3 mL $H_2O_2$. The increasing amount of Br at lower pH may also have contributed to the increase in Au recoveries.

EXAMPLE 8

Increasing Au Recoveries by Successive Leaching

To compare the performance of continuous leaching with staged leaching, tests were run in three successive stages on Test ore No. 4. Between stages the leachate was filtrated off and the tailing was leached in the next stage with fresh lixiviant of the same composition. The comparison of leach test using HBr alone on this Ore above shows the recovery increases by successive leaching.

Successive leach test in 3 stages with 1 h leaches per stage. Initial amount of ore: 200 g. At each stage (after filtration) addition of 241 mL water, 50 mL 48% HBr and 28 mL 35% $H_2O_2$. pH<2. Fire assay with dried tailing from stage 3 ran in duplicates (DupA and DupB). The results are shown in Table 3 below.

TABLE 3

| Parameter | Units | DupA | DupB |
|---|---|---|---|
| Mass Au leached in 3 stages from 200 g ore | mg Au | 4.702 | Same |
| Mass Au leached per ore mass | g Au/ton ore | 23.5 | Same |
| Total mass of dried tailing | g ore | 4.702 | Same |
| Mass Au retained in ½AT tailing | mg Au | 0.0294 | 0.0222 |
| Mass Au retained in 179.3 g tailing | mg Au | 0.361 | 0.273 |
| Mass Au, retained + leached based on 200 g ore | mg Au | 5.063 | 4.975 |

TABLE 3-continued

| Parameter | Units | DupA | DupB |
|---|---|---|---|
| Calculated head grade | g Au/ton ore | 25.3 | 24.9 |
| Recovery | Percent | 93 | 94.5 |

EXAMPLE 9

Red Wire Leaching and Co-Precipitation

Red wire leaching was performed to compare Au leaching from ore with Au dissolution from alloy; but also to prepare higher concentrated $AuBr_4^-$ solutions for studying the α-CD co-precipitation process.

Figure 7:
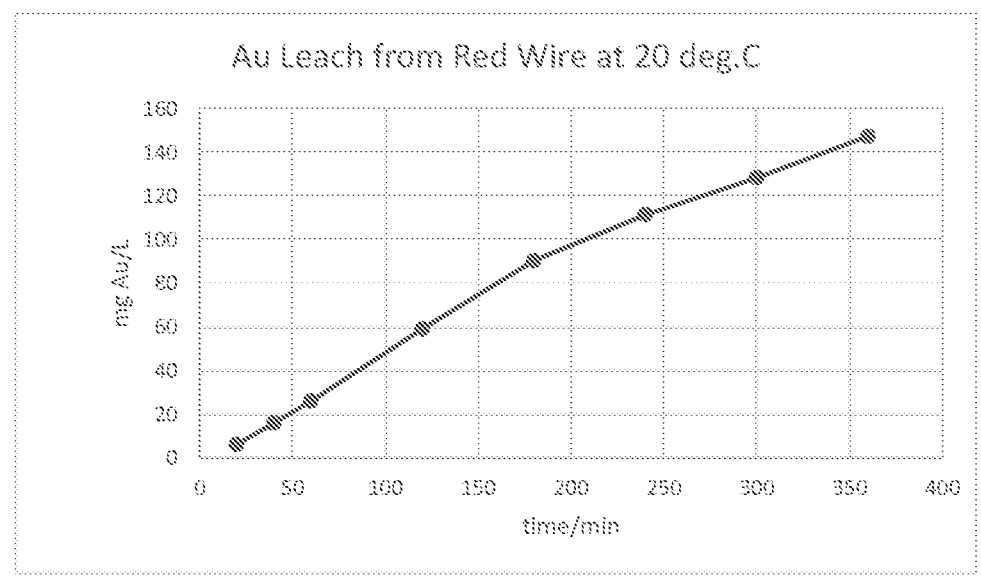
FIG. 7 shows the leach curve for red wire leaching at 20° C.

Cut and weighed pieces of red wire with the specification "Au 58.3% min, Cu>Ag" were leached for 6 hours at 20, 40 and 60° C. and at around pH 2 and ORP>700 mV with $H_2O/HBr/KBr/H_2O_2$, using the same reagent ratio for each temperature. The leach curve at 20° C. is shown in FIG. 7. The results show an approximately linear increase of leached amount of Au with time.

The Au recovery increases with temperature. The following Table 4 shows recoveries and Au concentrations in the leachate.

TABLE 4

| Temperature/° C. | Recovery | Au concentration/mM |
|---|---|---|
| 20 | 2.88% | 0.776 |
| 40 | 4.94% | 1.191 |
| 60 | 5.84% | 1.436 |

The leached wire pieces of the 20° C. run were subjected to a second stage leach under the same conditions, resulting into a 0.57 mM Au concentration for the leachate. 400 ml leachate from the 20° C. process having a Au concentration of 0.31 mM was treated with alkali (KOH) to reach a pH of 3.37.

Then 8.593 g alpha-cyclodextrin was added under stirring. Red-orange precipitation occurred and the mixture was cooled with ice for 90 minutes. The coprecipitate was separated from the mixture by filtration and the coprecipitate was dried overnight. The mass of the dried coprecipitate: 0.571 g, corresponding to 0.228 mM Au (based on molecular mass=2609.44 g/mol for $[K(OH_2)_6][AuBr_4] \subset (\alpha\text{-CD})_2$). Recovery from leachate: (0.228/0.31)·100=73.5%.

AAS of the filtrate gave 12.17 mg Au/L (0.065 mM Au/L). This results in a recovery from leachate of (0.776−0.065)/0.776·100=91.6%.

EXAMPLE 10

Coprecipitation Test and Au Assay on Ore Leachate
10.1 pH Adjustment to pH 3.5 to 4

Leachates from ores Nos. 3, 4 and 5 ore leach tests, in which $HBr/KBr/H_2O_2$ lixiviant was used, were combined. This solution had a pH<1 after concentrating. Addition of aq. KOH resulted in salt precipitation between pH 2 and 3. Salt and liquid were separated and the filtrate was used for co-precipitation with α-CD. It was split in two solutions, one of which was spiked with $KAuBr_4\ 2H_2O$ to mimic the conditions that would follow a more extreme concentration step.

10.2 Co-Precipitation from Au-Spiked Leachate
  Volume of leachate: 200 mL
  Leachate pH: 4.04
  Spiking: spiked with 396.23 mg $KAuBr_4.2H_2O$ (molecular mass=591.72 g/mol)
  Spiked Leachate Au content (AAS): 733.1 mg/L (146.6 mg/200 mL)
  Addition of α-CD: 1.5 g α-CD was stirred in at a solution temperature of 22° C. and stirred at 300 rpm. The stirring was stopped after 15 minutes and the solution with already visible co-precipitate was cooled with ice for 170 minutes. The coprecipitate was collected by vacuum filtration and then dried overnight.
10.3 Filtrate Analysis
  Volume of filtrate: 175 mL
  Filtrate Au content (AAS): 21.8 mg/L (3.815 mg/175 mL)
  From the initial 146.6 mg Au, 146.6-3.815=142.8 mg Au was co-precipitated, a yield of 142.8/146.6 100=97%. Or, from a process-sequence viewpoint, 3% got "lost" in the filtration step.
10.4 Theoretical Amount of Au in Obtained Co-Precipitate
  Mass of dried co-precipitate: 1007.154 mg
  Assuming the coprecipitate to be $[K(OH_2)_6][AuBr_4] \subset (\alpha\text{-CD})_2$ with molar mass=2609.44 g/mol, 1.007/2609.44=0.000386 mol coprecipitate was obtained. This corresponds to 0.000386 196.67=0.0759 g Au (75.9 mg Au) and 75.9/146.6·100=52% recovery.
10.5 Coprecipitate Assay
  A lead-wrap assay followed by a digestion/AAS analysis was applied to prove that the co-precipitate in fact contains gold. Duplicate co-precipitate samples were weighed out, each wrapped in lead foil and then processed by the cupellation procedure. The obtained beads were weighed. They were then dissolved in (digested with) $HBr/HNO_3$ (3/1, v/v) at slightly elevated temperature. The solution is analyzed by AAS. The results are given in Table 5 below.

TABLE 5

| Sample | Coprecip, mg | Bead, mg (gravim.) | Bead, mg (AAS) |
|---|---|---|---|
| 1 | 325.61 | 32.989 | 34.625 |
| 2 | 323.92 | 34.063 | 35.975 |

We conclude that the coprecipitate consists primarily of the potassium-gold-bromide-αCD₂ complex, possibly as the hexahydrate.
10.6 Coprecipitation from Non-Spiked Leachate
  Volume of leachate: 200 mL
  Leachate pH: 4.18
  Leachate Au content (AAS): 1.137 mg/L (0.227 mg/200 mL)
  Addition of α-CD: 0.499 g α-CD was stirred in at a solution temperature of 22° C. and stirred at 300 rpm. The stirring was stopped after 15 minutes and the solution with already visible co-precipitate was cooled with ice for 195 minutes. The coprecipitate was collected by vacuum filtration and then dried overnight.
10.7 Filtrate and Coprecipitate Analysis
  Volume of filtrate: 193 mL
  Filtrate Au content (AAS): 1.143 mg/L (0.221 mg/193 mL)
  From the initial 0.227 mg Au, 0.227-0.221=0.006 mg Au was coprecipitated, a yield of 0.006/0.221.100=2.7%.
  The coprecipitate was collected and analysed by the technique used in 10.5, and the lead wrap assay and analysis of the dissolved bead show that the precipitate does contain gold and appears to be $[K(OH_2)_6][AuBr_4] \subset (\alpha\text{-CD})_2$. However the quantities recovered are too low to give a reliable measure of the yield from precipitate.

EXAMPLE 11—LEACH TESTS ON ORE NO. 5

Samples of 60 g or 300 g Ore No. 5 milled to 90% minus 100 mesh, were subjected to beaker scale leaching (BKS) tests for 2 or 6 hours using the general method described in Example 1 above, using the lixiviant make-up mentioned in Table 6.

TABLE 6

| Time | Mass Sample | Lixiviant | ORP Goal mV | pH | Recovery % |
|---|---|---|---|---|---|
| 2 hr | 60 g | 4 mL 48% HBr + conc. $HNO_3$ (3/1, v/v) | | 1 | 0 |
| 2 hr | 60 g | 3 g KBr, 0.5 mL 48% HBr, 2.5 mL 35% $H_2O_2$ | | 2 | 2 |
| 2 hr | 60 g | 3 g KBr, 3 mL 48% HBr, 4 mL 35% $H_2O_2$ | >800 | <1 | 24 |
| 6 hr | 300 g | 15 g KBr, 14 mL 48% HBr, 10 mL 35% $H_2O_2$ | | 1 | 58 |
| 2 hr | 60 g | 4 mL 48% HBr, 3 mL 35% $H_2O_2$ | | <1 | 80[1] |

The water included in lixiviant was 72 ml for 60 g samples and 360 ml for 300 g samples.
[1]Calculated from head grade and solution concentration

CONCLUSIONS

The yield of gold in the lixiviate can exceed the yields using conventional cyanide leach for this ore (around 70%). Very low pH gives the highest yields; while increasing the time from 2 to 6 hrs also increases the yield. Controlling the ORP by increasing the level of $H_2O_2$ also significantly increases the yield.

APPENDIX A: ORE

Test Ore No 1.
Test Ore No. 1 has a head grade of 9.68 ppm Au, based on ICP analysis (AAL). An Ag content of 231.0 ppm was determined gravimetrically. The Au:Ag ratio is around 1:20. ICP analysis also gave a large content of Ca: (around $12 \times 10^4$ ppm) assumed to be in the form of calcium carbonate. The gas evolution around pH 5 (assumed to be $CO_2$), observed during pH titration of ore suspensions (see graph below), can be explained by this assumption, for which further evidence is provided by the measured mass loss during heat-treatment (1000° C.) of weighed amounts of ore. For 100 g Test Ore No. 1 a mass loss of 17.8 g was found by heat treatment and a loss of 17.2 g (0.39 M) $CO_2$ was calculated based on the observed amount of conc. $HNO_3$ needed to end foaming of a measured ore suspension. 0.39 M $CO_2$ is more than the maximum of 0.31 M $CO_2$, that can stoichiometrically be associated with 12.42 g Ca in 100 g ore. The "excess $CO_2$" is possibly contained in the carbonates of other earth alkali elements such as Ba and Mg, which also are present in this ore. Aqueous suspensions of ore are alkaline, with a pH above 8. This ore has additionally been tested for sulfur (pyrite) content; values are around 180-240 ppm sulfur.

Test Ore No. 2.
This ore has a calculated head grade between 4 to 9 ppm, based on leachate and tailing analysis. The Au:Ag ratio and carbonate content are about the same as Test Ore 1.

Test Ore No. 3.
This ore has a head grade of 3.3 to 4.2 ppm Au, based on a triplicate fire assay/acid digestion analysis. Analysis of leachates and tailings from various leach tests gave calculated head grades between 2.2 and 4 ppm. This ore contains only a quarter amount of Ca, (about $3 \times 10^4$ ppm) compared with Test Ore No. 1, but about three times as much Mg (about $1.5 \times 10^4$ ppm). Further, it has more than 50 times as much S (about $10^4$ ppm). Its Ag content is 0.8 ppm.

Test Ore No. 4.
Test Ore No. 4 has a head grade of 13 to 28 ppm Au, around 8 ppm Ag, and around $9 \times 10^3$ ppm Cu based on a duplicate fire assay/acid digestion analysis. Analysis of leachates and tailings from various leach tests give calculated head grades between 17 and 33 ppm, i.e. this ore contains little or no carbonate but is high in sulfur—around $3 \times 10^4$ ppm.

Test Ore No. 5.
This ore has a head grade of 1.7-2.0 ppm Au, 14-15.5 ppm Ag, $1.5 \times 10^3$ ppm Ca, $10^3$ ppm Mg, 107 to 114 ppm Cu and around $9 \times 10^3$ ppm sulfur. It is very low in carbonate.

pH Titration of Ores
Suspension of the ores were subjected to titration with 48% HBr. The pH was measured. The results are shown in FIG. 4.

REFERENCE NUMERALS SUMMARY

1. Vat system
2. Rejuvenation of lixiviate
3. Solid liquid separation
4. Gold crystallisation step
5. Gold reduction
6. Recovery of other metals from liquid
7. Reduction of other metals
10. Ore addition
11. Ore heap
13. Pregnant lixiviate tank
14. Clarifier filter
15. Solid recycle stream
16. Concentrator
17. Dilute phase recycle stream
18. Lixiviant rejuvenation tank
19. Concentrated a $AuBr_4$ solution stream
20. Crystallizer
21. Lixiviant stream
22. Lixiviate stream
23. α-CD addition
24. Precipitate stream
25. Solid-liquid separation/product filter
26. Solid stream
27. Reduction
28. side-product recovery
29. Residual liquid recycle
31. Ore addition to leach Vat 1
32. HBr addition
33. Pregnant lixiviate
34. Treated solid output from leach vat 1 becomes input for leach vat 2
35. Gas vent
36. Lixiviate from leach vat 2 becomes lixiviant for leach vat 1
37. Ore output from leach vat 2, input into leach vat 2
38. Lixiviate from leach vat 3 becomes lixiviant for leach vat 2
39. Spent ore
40. $KAuBr_4$ stream
41. Solids from clarifier
42. Pregnant concentrate stream
43. Bromination tank 44. α-CD addition
45. Base (KOH) neutralisation
46. Coolant inlet
47. Coolant outlet
48. Complex slurry
49. Rinse after filtration
50. Product filter (25) filtrate
51. Stream containing filter media including $KAuBr_4(CD)_2$ complex
52. Ore rinsing
55. Water addition
58. Potassium bromide addition
59. Hydro bromic acid replenishment
60. Hydrogen peroxide
61. Rejuvenated lixiviant stream
62. Ore rinse
63. Ore rinsate

The invention claimed is:

1. A method of purifying precious metal from a precious metal-bearing material comprising the steps
    a) forming an aqueous acidic oxidant mixture having a pH in the range 1 to 6 by mixing hydrogen peroxide, an acid and a source of bromide ion;
    b) contacting the acidic oxidant mixture with the precious metal bearing-material to oxidise the metal and form a metal bromide salt solution containing the metal bromide $MBr_n$ and/or $[MBr_{n+1}]^-$ where n is the valency of the oxidised metal ion $M^{n+}$; and
    c) controlling the pH of the metal bromide salt solution to a value in the range 3-7 by providing alkali metal ions $A^+$ in the solution to form an alkali metal/metal bromide solution containing the salt $AMBr_{n+1}$ in solution.

2. A method according to claim 1, wherein the precious metal is selected from gold, silver, platinum and palladium.

3. A method according to claim 1, wherein the acid is selected from hydrogen bromide, nitric acid, sulphuric acid and mixtures thereof.

4. A method according to claim 1, wherein the source of bromide ion is selected from the group consisting of sodium bromide and potassium bromide.

5. A method according to claim 1, wherein the pH in step a) is in the range 1 to 2.

6. A method according to claim 1, wherein the pH in step c) is in the range 3 to 6.

7. A method according to claim 1, wherein the pH in step c) is higher than the pH in step a), and wherein in step c) the pH is adjusted by adding an alkali metal hydroxide.

8. A method according to claim 1, further comprising the steps of:
    d) adding cyclodextrin to the alkali metal/metal bromide solution to precipitate a metal cyclodextrin complex; and
    e) recovering the metal cyclodextrin complex.

9. A method according to claim 8, wherein the cyclodextrin is selected from α-cyclodextrin, β-cyclodextrin and γ-cyclodextrin.

10. A method according to claim 8, wherein recovery of the metal cyclodextrin complex is by filtration or centrifugation.

11. A method according to claim 10, wherein the metal cyclodextrin complex is treated by reducing the $M^{n+}$ cation to $M^o$ metal and the precious metal is recovered.

12. A method according to claim 8, wherein the precious metal-bearing material is selected from a gold ore, containing 0.1 to 10 ppm gold metal, a metal mixture, slag or tailings from refining of metals other than gold, a post-consumer product, or a human-body component.

13. A method according to claim 1, wherein the concentration of the $AMBr_{n+1}$ salt solution is at least 10 mg/l (based on gold mass) prior to addition of cyclodextrin.

14. A method according to claim 1, wherein the precious metal-bearing material is in the form of particulate material in a heap during step b), and where the $AMBr_{n+1}$ salt is recovered as leachate from the heap.

15. A method according to claim 1, wherein the precious metal-bearing material is in the form of a slurry of particles suspended in the aqueous oxidant mixture during step b).

16. A method according to claim 15, wherein the slurry is treated in a sequence of vats wherein treated solids flow in one direction through said sequence and pregnant leachate flows in the opposite direction through said sequence.

17. A method according to claim 1, wherein said method is a continuous process, wherein the oxidation-reduction potential of the oxidant mixture in step a) and of the $AMBr_{n+1}$ salt solution are measured as relative rates of addition of the oxidant mixture, and wherein the precious metal-bearing material in the process streams is controlled by reference to the oxidation reduction potential of the $AMBr_{n+1}$ salt solution.

18. A method according to claim 17, wherein the oxidation reduction potential is measured by detecting the difference between the electrical potential of a measurement electrode in contact with the solution being measured.

19. A method according to claim 17, wherein the oxidation reduction potential of the acidic oxidant mixture is at least +500 mV.

20. A method according to claim 1, wherein the pH in step a) is in the range 1 to 5.

* * * * *